United States Patent [19]
Chang

[11] Patent Number: 5,724,373
[45] Date of Patent: Mar. 3, 1998

[54] MICROPHOTONIC ACOUSTO-OPTIC TUNABLE LASER

[75] Inventor: Kok-Wai Chang, Sunnyvale, Calif.

[73] Assignee: Hewlett-Packard Company, Palo Alto, Calif.

[21] Appl. No.: 751,137

[22] Filed: Nov. 15, 1996

[51] Int. Cl.$^6$ ...................................................... H01S 3/10
[52] U.S. Cl. .................................. 372/20; 372/13; 372/27
[58] Field of Search ....................................... 372/12, 13, 20, 372/21, 23, 27, 29, 37, 43, 70, 92, 98

[56] References Cited

U.S. PATENT DOCUMENTS

| | | | |
|---|---|---|---|
| 4,736,382 | 4/1988 | O'Meara | 372/32 |
| 4,852,106 | 7/1989 | Hino et al. | 372/9 |
| 4,945,539 | 7/1990 | Bagshaw et al. | 372/13 |
| 4,975,918 | 12/1990 | Morton | 372/20 |
| 5,140,599 | 8/1992 | Trutna, Jr. et al. | 372/20 |
| 5,263,037 | 11/1993 | Trutna, Jr. et al. | 372/20 |
| 5,390,204 | 2/1995 | Yessik et al. | 372/38 |
| 5,452,314 | 9/1995 | Aronson | 372/20 |
| 5,621,745 | 4/1997 | Yessick et al. | 372/26 |

Primary Examiner—Brian Healy

[57] ABSTRACT

A tunable laser that includes a laser amplifier and an acousto-optic filter (AOTF). The AOTF includes a waveguide having first and second ports. A first polarization filter passes light of a first polarization state, the first polarization filter being located between the laser amplifier and the first port of the AOTF. The laser also includes a first asymmetrical polarization rotator located between the first port of the AOTF and the first polarization filter. The first asymmetrical polarization rotator rotates the polarization of light traveling from the first port of the AOTF to the first polarization filter by 90° while leaving unchanged the polarization of light traveling from the first polarization filter to the first port of the AOTF. A mirror reflects light leaving the second port of the AOTF back into the second port of the AOTF. A second polarization filter located between the mirror assembly and the second port of the AOTF passes light of a second polarization state which is orthogonal to the first polarization. A second asymmetrical polarization rotator is located between the second port of the AOTF and the second polarization filter. The second asymmetrical polarization rotator rotates the polarization of light traveling from the second polarization filter to second port of the AOTF by 90° while leaving unchanged the polarization of light traveling from the second port of the AOTF to the second polarization filter.

4 Claims, 3 Drawing Sheets

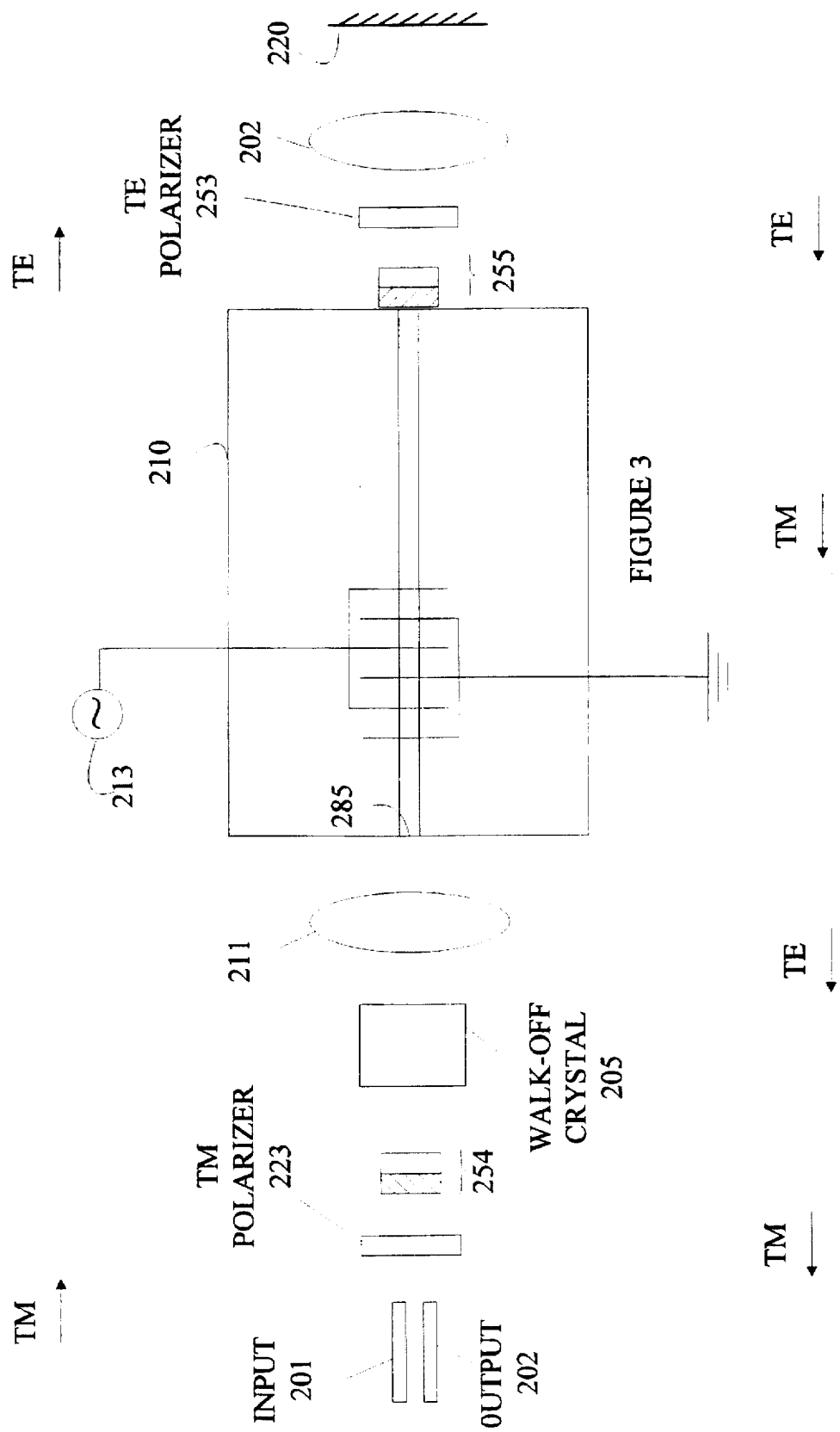

MICROPHOTONIC ACOUSTO-OPTIC TUNABLE LASER

FIELD OF THE INVENTION

The present invention relates to lasers, and more particularly, to lasers that can be tuned using acoustic-optical filters.

BACKGROUND OF THE INVENTION

Tunable lasers based on acousto-optic filters (AOTFs) are known to the prior art. Basically, these lasers utilize AOTFs to select the wavelength of light that is amplified by the lasing element. An AOTF is an electronically tunable optical bandpass filter. Light traveling in a waveguide having a first polarization has its polarization rotated by an acoustic wave in a birefringent crystal in which the waveguide is constructed. The wavelength of the light whose polarization is rotated is determined by frequency of the acoustic wave. Hence, only light in a very narrow band has its polarization rotated. This light is selected by a polarization filter which passes light having the rotated polarization. Incident light outside of the band whose polarization is not rotated is blocked by this filter. Unfortunately, the frequency of the light in the pass band is Doppler shifted by the acoustic wave. Hence, if a single AOTF is placed in a laser cavity, the light will be progressively shifted in frequency with each pass. Prior art lasers based on AOTFs typically avoid this frequency shift, by including a second AOTF which rotates the polarization in the other direction, and hence, applies a Doppler shift that cancels the first Doppler shift.

Hence, to provide a tunable laser, two AOTFs separated by a polarization filter must be constructed within the cavity. The need to provide such a double filter element substantially increases the cost of the laser. In this regard, it should be noted that the two AOTFs must be identical to assure that complete cancellation of the Doppler shift provided by the first AOTF is achieved.

Broadly, it is the object of the present invention to provide an improved AOTF element for use in lasers.

It is a further object of the present invention to provide a tunable laser that requires only a single AOTF.

These and other objects of the present invention will become apparent to those skilled in the art from the following detailed description of the invention and the accompanying drawings.

SUMMARY OF THE INVENTION

The present invention is a tunable laser that includes a laser amplifier and an acousto-optic filter (AOTF). The AOTF includes a waveguide having first and second ports. A first polarization filter passes light of a first polarization state. The first polarization filter is located between the laser amplifier and the first port of the AOTF. The laser also includes a first asymmetrical polarization rotator located between the first port of the AOTF and the first polarization filter. The first asymmetrical polarization rotator rotates the polarization of light traveling from the first port of the AOTF to the first polarization filter by 90° while leaving unchanged the polarization of light traveling from the first polarization filter to the first port of the AOTF. A mirror reflects light leaving the second port of the AOTF back into the second port of the AOTF. A second asymmetrical polarization filter is located between the mirror and the second port of the AOTF. The second asymmetrical polarization filter passes light of a second polarization state which is orthogonal to the first polarization. A second asymmetrical polarization rotator is located between the second port of the AOTF and the second polarization filter. The second asymmetrical polarization rotator rotates the polarization of light traveling from the second polarization filter to the second port of the AOTF by 90° while leaving unchanged the polarization of light traveling from the second port of the AOTF to the second polarization filter.

The teachings of the present invention may be applied to ring lasers and the like by including a walk-off crystal that laterally displaces the light leaving first port of the AOTF relative to the light entering the first port.

BRIEF DESCRIPTION OF THE DRAWINGS

FIG. 3 is a schematic drawing of a second preferred embodiment of the present invention.

DETAILED DESCRIPTION OF THE INVENTION

Figure 1:
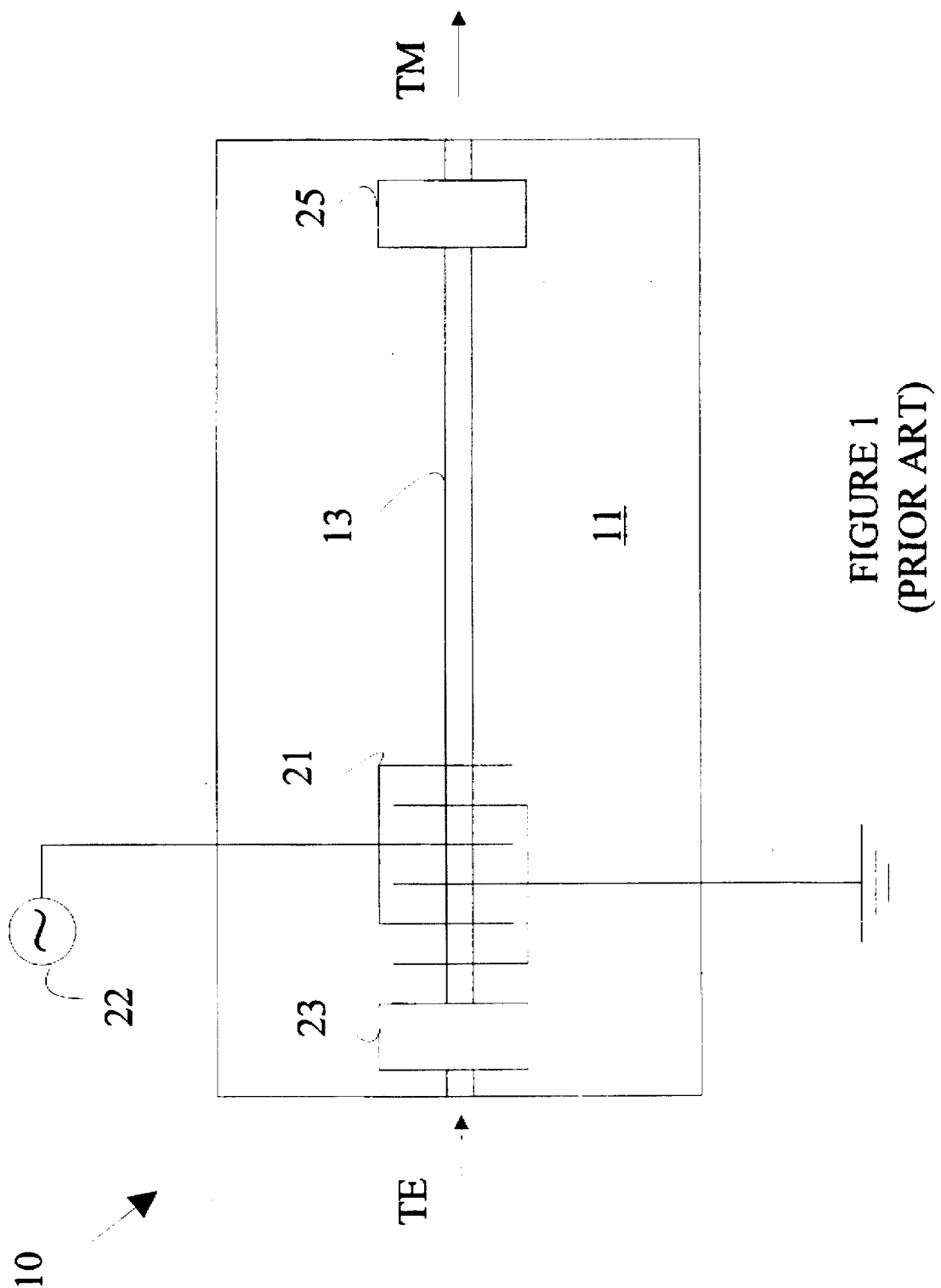
FIG. 1 is a schematic drawing of a typical AOTF.

The present invention may more easily be understood with reference to a conventional AOTF as shown in FIG. 1 at 10. AOTF 10 is fabricated in a crystalline substrate 11 such as lithium niobate. An optical waveguide 13 is formed in the upper surface of substrate 11. A surface acoustic wave is induced in the waveguide by a transducer 21 which is driven by signal generator 22. The frequency of the acoustic wave is determined by the frequency of the signal from generator 22.

The acoustic wave generates a diffraction grating in the waveguide. The grating couples the transverse electric (TE) and transverse magnetic (TM) polarization modes of the light within the narrow band of frequencies corresponding to the diffraction grating spacing. Within this narrow band, light propagating in one polarization mode is converted to the orthogonal polarization mode. The polarization of the light outside of this band is not converted.

The rotation of the plane of polarization of the light in the narrow band is used to construct a filter that passes only light in this narrow band by utilizing two polarization filters at the ends of the waveguide. For example, a TE pass polarization filter 23 at one end of the waveguide blocks any light that is not in the TE mode from entering the waveguide. A light signal including light within the band of interest having a TE polarization is applied to this filter. The polarization of the light within the band of interest leaving the waveguide will have been rotated to the TM mode. A TM pass polarization filter 25 at the other end of the waveguide allows this light to pass while blocking light in the TE mode. Hence, light outside of the narrow band of interest is blocked.

As light passes through the waveguide and is diffracted by the acoustic wave, the frequency of the light is Doppler-shifted because the grating induced by the acoustic wave is in motion with respect to the waveguide. Light propagating in the direction from filter 23 to filter 25 will be downshifted or upshifted in frequency depending on the direction of travel of the light relative to the direction of motion of the acoustic wave.

As noted above, this frequency shift causes problems in applications in which the AOTF is used to construct a laser. One prior art solution to this problem is to include a second AOTF in which the light propagates in the opposite direction with respect to the acoustic wave thereby causing an upshifting of the light frequency that cancels the downshift. Unfortunately, to exactly cancel the Doppler shift, the second AOTF must be identical to the first AOTF. This requirement significantly increases the cost of a laser utilizing this type of tunable filter.

Figure 2:
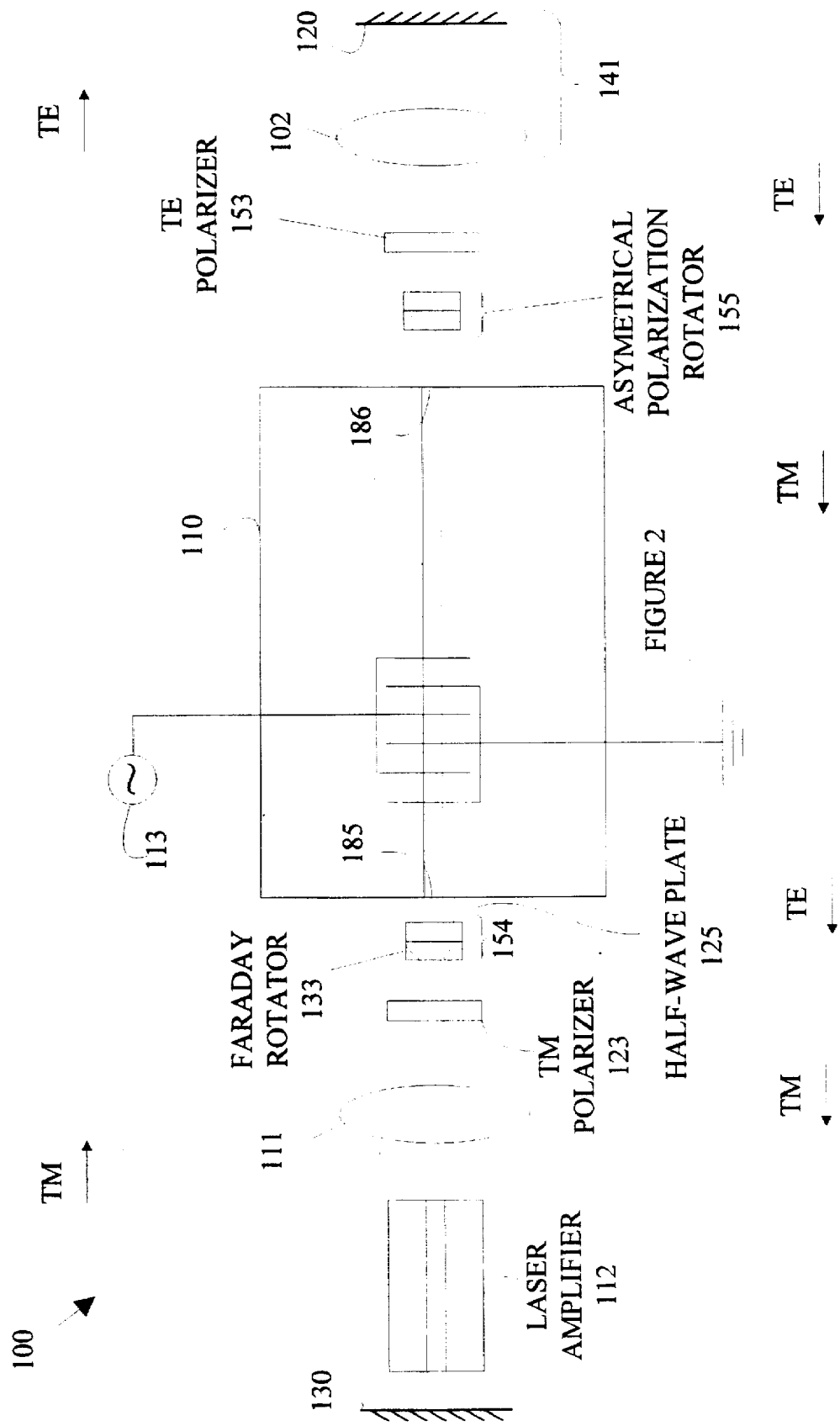
FIG. 2 is schematic drawing of a laser according to the present invention.

The present invention is based on the observation that the Doppler shift can be canceled by passing the light leaving filter 25 back through the AOTF in the direction from filter 25 to filter 23. Refer now to FIG. 2 which is a schematic drawing of a tunable laser 100 according to the present invention. Light leaving laser amplifier 112 is focused into an input port of AOTF 110 after passing through a polarizer 123 and a first asymmetrical polarization rotator 154 whose function will be discussed in more detail below. The light leaving AOTF 110 passes through a second asymmetrical polarization rotator 155 and a polarizer 153. The light leaving polarizer 153 is reflected by a reflector 141 which reverses the direction of travel of the light and images the reflected light back into port 186 of AOTF 110 after passing through polarizer 153 and asymmetrical polarization rotator 155. The light leaving port 185 of AOTF passes through asymmetrical polarization rotator 154 and polarizer 123 prior to being imaged into laser amplifier 112 by lens 111. The amplified light signal is reflected back into laser amplifier 112 by mirror 130.

The present invention utilizes asymmetrical polarization rotators shown at 154 and 155. These rotators rotate the polarization of the light in a manner that depends on the direction of travel of the light through the rotator. In one direction, the polarization remains unchanged, and in the other direction, the polarization is rotated by 90° thereby converting TM polarized light to TE polarized light, and vice versa. In the preferred embodiment of the present invention, the asymmetrical polarization rotators are constructed from a 45° Faraday rotator and a half-wave plate, as shown at 133 and 125, respectively. The Faraday rotator rotates the direction of polarization by 45° in a direction that depends on the direction of travel of the light relative to the magnetic field in the Faraday rotator. The half-wave plate has its optical axis set at 22.5° with respect to the TM or TE polarization direction. The half-wave plate rotates the direction of polarization of the light by 45° in a direction that is independent of the direction of travel of the light. Hence, in one direction the 45° rotation provided by the Faraday rotator adds to the 45° rotation provided by the half-wave plate to generate a 90° rotation of the polarization. In the other direction, the 45° rotation provided by the Faraday rotator cancels the 45° rotation provided by the half-wave plate leaving the direction of polarization unchanged.

Having explained the function of the polarization rotators, the manner in which tunable laser 100 operates will now be discussed. It will be assumed that light leaving laser amplifier 112 in the direction of AOTF 110 is TM polarized. Lens 111 focuses the light leaving amplifier 112 into the first port 185 of the waveguide of AOTF 110. However, before reaching AOTF 110 this light passes through a TM polarizer 123 and asymmetrical polarization rotator 154. Rotator 154 is configured such that the polarization of the light passing in the direction from laser amplifier 112 to AOTF 110 is unchanged; hence, the light entering AOTF 110 is TM polarized. Light in a band determined by the frequency of oscillator 113 is converted to TE polarized light and Doppler downshifted or upshifted in frequency. This light leaves AOTF 110 through a second port 186 and passes through the second asymmetrical polarization rotator 155. Polarization rotator 155 is configured such that the polarization of light leaving AOTF 110 is not altered. The light leaving rotator 155 passes through a TE polarizer 153 which eliminates any light having a frequency outside of the frequency band of interest, i.e., the remaining light that is still TM polarized.

The light leaving TE polarizer 153 is then reflected from a reflector 141 comprising mirror 120 and lens 112 and imaged back into AOTF 110. A concave mirror may alternatively be used as the reflector 141. This light is still TE polarized; hence, it passes through TE polarizer 153 and then through rotator 155 before entering the second port of the waveguide of AOTF 110. However, in this direction of travel, the polarization of the light is rotated 90° by rotator 155; thus, the light entering AOTF 110 is now TM polarized.

The polarization of the light in the narrow band of interest will be rotated to TE by AOTF 110 and the frequency of that light will be Doppler upshifted or downshifted by an amount exactly equal to the Doppler downshift or upshift, respectively, experienced by the light in traversing AOTF in the opposite direction. The light leaving AOTF 110 in the frequency band of interest will be TE polarized. Asymmetrical polarization rotator 154 will convert this light to the TM polarization, and TM polarizer 123 will block the light outside of the frequency band of interest, since that light will now be TE polarized. The light leaving polarizer 123 is imaged back into laser amplifier 112 by lens 111. Light leaving laser amplifier 112 is reflected back toward AOTF 110 by mirror 130. Light may be outputted from laser 100 by making either mirror 120 or mirror 130 partially reflecting. In the preferred embodiment of the present invention, mirror 130 is part of laser amplifier 112, and mirror 120 is the partially reflecting mirror.

The polarizers, rotators and AOTF have been shown spaced apart in FIG. 2 to simplify the above description. However, it should be noted that in the preferred embodiment of the present invention, these components are in contact. In particular, the rotators and polarizers are preferably attached to the ends of AOTF 110 to form a single assembly.

The teachings of the present invention may also be applied to lasers in which the laser amplifier is remote from the AOTF and is coupled, for example, by optical fibers. FIG. 3 illustrates the manner in which the present invention may be utilized in a ring laser in which the lasing amplifier is connected by input and output polarization maintaining fibers 201 and 202, respectively. To simplify the following discussion, elements shown in FIG. 3 that serve the same functions as elements shown in FIG. 2 have been given labels that differ from the corresponding elements in FIG. 2 by 100. These elements will not be discussed in detail here. The arrangement shown in FIG. 3 includes a walk-off crystal 205 which is oriented such that its walk-off direction results in light of one polarization being displaced laterally with respect to the axis of optical fiber 201. A light beam entering walk-off crystal 205 will be displaced laterally by an amount that depends on the polarization of the light. The system is configured such that TM polarized light arriving via input fiber 201 is imaged into AOTF 210. This light is processed by AOTF 210 and the components following it and leaves port 285 as TE polarized light. Walk-off crystal 205 displaces this TE polarized light by an amount sufficient to image the light into output fiber 202. The TE polarized light is converted back to TM polarized light by polarization rotator 254.

The above described embodiments of the present invention have assumed that the light leaving the laser amplifier was TM polarized. However, it will be apparent to those skilled in the art that the teachings of the present invention may be applied to a laser amplifier in which the light leaving the amplifier is TE polarized by changing the polarization filters discussed with reference to FIGS. 2 and 3.

Various modifications to the present invention will become apparent to those skilled in the art from the foregoing description and accompanying drawings. Accordingly, the present invention is to be limited solely by the scope of the following claims.

What is claimed is:

1. A tunable laser, comprising:

a laser amplifier;

an AOTF including a waveguide therein having first and second ports;

a first polarization filter, said first polarization filter being located between said laser amplifier and said first port of said AOTF;

a first asymmetrical polarization rotator, said first asymmetrical polarization rotator being located between said first port of said AOTF and said first polarization filter;

a reflector located to reflect light leaving said second port of said AOTF back into said second port of said AOTF;

a second polarization filter, said second polarization filter being located between said mirror and said second port of said AOTF; and a second asymmetrical polarization rotator, said second asymmetrical polarization rotator being located between said second port of said AOTF and said second polarization filter.

2. The laser of claim 1, wherein at least one of said first and second asymmetrical polarization rotators comprises a 45° Faraday rotator and a half-wave plate.

3. The laser of claim 1, wherein said first and second polarization rotators are bonded to said first and second ports, respectively, of said AOTF.

4. The laser of claim 1 further comprising:

an input optical fiber and an output optical fiber, said input optical fiber coupling light from said laser amplifier and said output optical fiber coupling light from said AOTF to said laser amplifier, said input and output optical fibers being displaced relative to one another; and a walk-off crystal, said walk-off crystal causing light of a first polarization state to be spatially displaced relative to light of a second polarization state.

* * * * *